(12) United States Patent
Jones et al.

(10) Patent No.: US 6,829,665 B2
(45) Date of Patent: Dec. 7, 2004

(54) NEXT SNOOP PREDICTOR IN A HOST CONTROLLER

(75) Inventors: Phillip M. Jones, Spring, TX (US); Paul B. Rawlins, Spring, TX (US); Kenneth T. Chin, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 411 days.

(21) Appl. No.: 09/965,871

(22) Filed: Sep. 28, 2001

(65) Prior Publication Data

US 2003/0065843 A1 Apr. 3, 2003

(51) Int. Cl.⁷ .............................................. G06F 13/00
(52) U.S. Cl. ..................... 710/107; 710/305; 710/306; 711/146
(58) Field of Search ................................. 710/107, 305, 710/306, 20, 21, 52; 711/141, 143, 146, 167, 168, 163; 709/100, 200

(56) References Cited

U.S. PATENT DOCUMENTS

| | | | |
|---|---|---|---|
| 5,313,626 A | | 5/1994 | Jones et al. ................. 395/575 |
| 5,331,646 A | | 7/1994 | Krueger et al. ............ 371/40.1 |
| 5,367,669 A | | 11/1994 | Holland et al. ............. 395/575 |
| 5,630,094 A | * | 5/1997 | Hayek et al. ................ 711/146 |
| 5,813,036 A | * | 9/1998 | Ghosh et al. ................ 711/146 |
| 5,822,611 A | * | 10/1998 | Donley et al. ................. 710/6 |
| 5,893,151 A | * | 4/1999 | Merchant ..................... 711/140 |
| 5,991,819 A | * | 11/1999 | Young ......................... 709/253 |
| 6,098,132 A | | 8/2000 | Olarig et al. ............... 710/103 |
| 6,115,796 A | * | 9/2000 | Hayek et al. ................ 711/146 |
| 6,223,301 B1 | | 4/2001 | Santeler et al. ................. 714/6 |
| 6,304,945 B1 | * | 10/2001 | Koenen ...................... 711/141 |
| 6,321,307 B1 | * | 11/2001 | Maguire et al. ............ 711/146 |
| 6,405,291 B1 | * | 6/2002 | Ghosh et al. ................ 711/146 |
| 6,463,510 B1 | * | 10/2002 | Jones et al. ................. 711/138 |
| 6,487,621 B1 | * | 11/2002 | MacLaren ................... 710/240 |
| 6,591,348 B1 | * | 7/2003 | Deshpande et al. ......... 711/141 |
| 6,615,319 B2 | * | 9/2003 | Khare et al. ................ 711/141 |
| 2002/0087811 A1 | * | 7/2002 | Khare et al. ................ 711/146 |
| 2003/0065860 A1 | * | 4/2003 | Lester et al. ................ 710/305 |
| 2003/0115424 A1 | * | 6/2003 | Bachand et al. ............ 711/146 |

* cited by examiner

Primary Examiner—Xuan M. Thai

(57) ABSTRACT

A technique for optimizing cycle time in maintaining cache coherency. Specifically, a method and apparatus are provided to optimize the processing of requests in a multi-processor-bus system which implements a snoop-based coherency scheme. The acts of snooping a bus for a first address and searching a posting queue for the next address to be snooped are performed simultaneously to minimize the request cycle time.

21 Claims, 3 Drawing Sheets

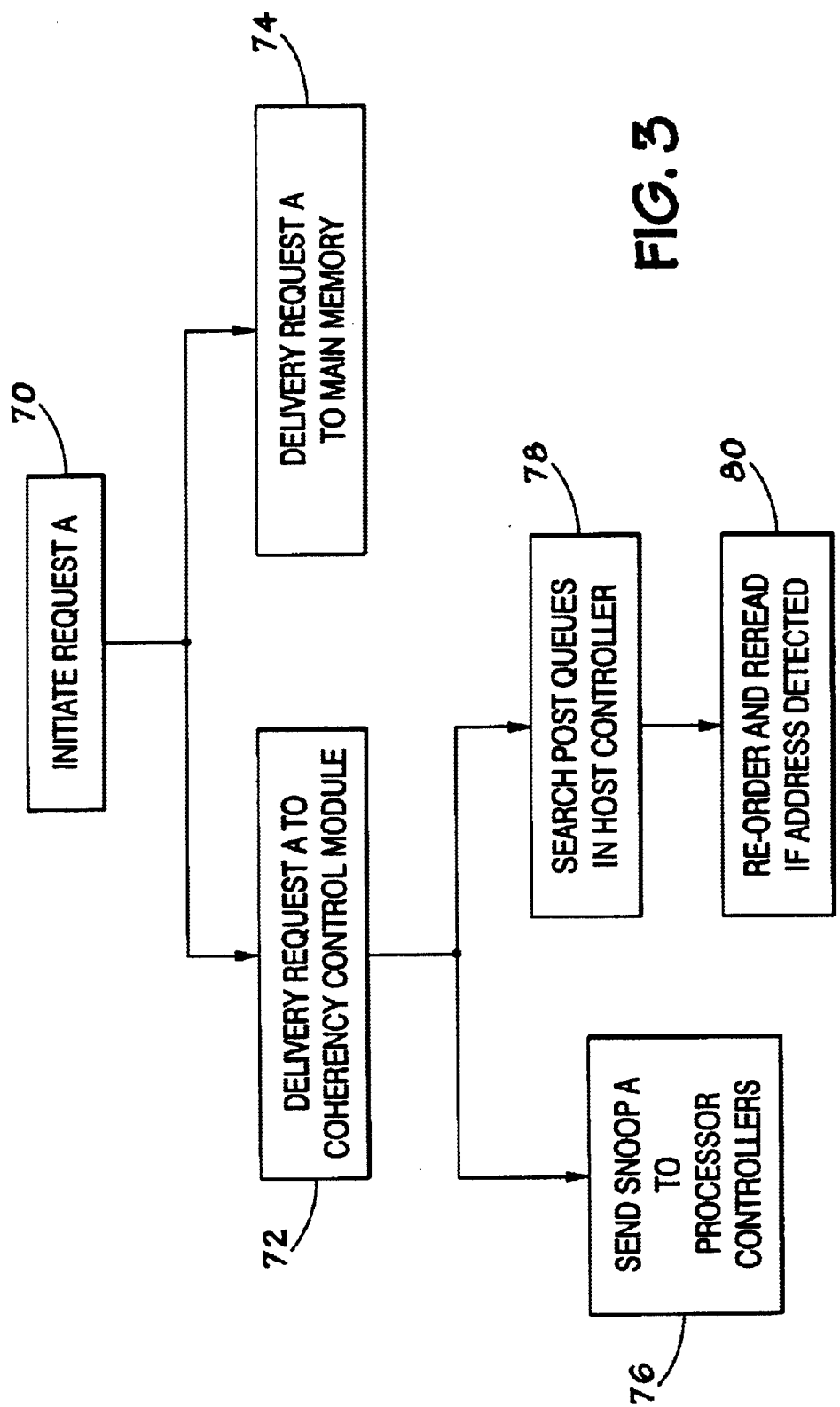

NEXT SNOOP PREDICTOR IN A HOST CONTROLLER

CROSS-REFERENCE TO RELATED APPLICATIONS

The following commonly owned application is hereby incorporated by reference for all purposes:

U.S. patent application Ser. No. 09/965,894, filed on Sep. 28, 2001, entitled "Efficient Snoop Filter in a Multi-Processor-Bus System" by Paul Rawlins and Phil Jones.

BACKGROUND OF THE INVENTION

1. Field of the Invention

This invention relates generally to memory systems with multiple processors and multiple processor buses and, more particularly, to a technique for reducing the cycle time of processing requests through a memory system.

2. Description of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The use of computers has increased dramatically over the past few decades. In years past, computers were relatively few in number and primarily used as scientific tools. However, with the advent of standardized architectures and operating systems, computers soon became virtually indispensable tools for a wide variety of business applications. Perhaps even more significantly, in the past ten to fifteen years with the advent of relatively simple user interfaces and ever increasing processing capabilities, computers have now found their way into many homes.

The types of computer systems have similarly evolved over time. For example, early scientific computers were typically stand alone systems designed to carry out relatively specific tasks and required relatively knowledgeable users. As computer systems evolved into the business arena, mainframe computers emerged. In mainframe systems, users utilized "dumb" terminals to provide input to and to receive output from the mainframe computer while all processing was done centrally by the mainframe computer. As users desired more autonomy in their choice of computing services, personal computers evolved to provide processing capability on each users desktop. More recently, personal computers have given rise to relatively powerful computers called servers. Servers are typically multi-processor computers that couple numerous personal computers together in a network. In addition, these powerful servers are also finding applications in various other capacities, such as in the communications and Internet industries.

Computers today, such as the personal computers and servers discussed above, rely on microprocessors, associated chip sets, and memory chips to perform most of their processing functions. Because these devices are integrated circuits formed on semiconducting substrates, the technological improvements of these devices have essentially kept pace with one another over the years. In contrast to the dramatic improvements of the processing portions of the computer system, the mass storage portion of the computer system has experienced only modest growth in speed and reliability. As a result, computer systems failed to capitalize fully on the increased speed of the improving processing systems due to the dramatically inferior capabilities of the mass data storage devices coupled to the systems.

There are a variety of different memory devices available for use in microprocessor-based systems. The type of memory device chosen for a specific function within a microprocessor-based system generally depends upon which features of the memory are best suited to perform the particular function. There is often a tradeoff between speed and cost of memory devices. Memory manufacturers provide an array of innovative, fast memory chips for various applications. Dynamic Random Access Memory (DRAM) devices are generally used for main memory in computer systems because they are relatively inexpensive. When higher data rates are necessary, Static Random Access Memory (SRAM) devices may be incorporated at a higher cost. To strike a balance between speed and cost, computer systems are often configured with cache memory. Cache memory is a special high-speed storage mechanism which may be provided as a reserved section of the main memory or as an independent high-speed storage device. A memory cache is a portion of the memory which is made of the high speed SRAM rather than the slower and cheaper DRAM which is used for the remainder of the main memory. Memory caching is effective since most computer systems implement the same programs and request access to the same data or instructions repeatedly. By storing frequently accessed data and instructions in the SRAM, the system can minimize its access to the slower DRAM.

Some memory caches are built into the architecture of the microprocessor themselves, such as the Intel 80486 microprocessor and the Pentium processor. These internal caches are often called level 1 (L1) caches. However, most modem computer systems also include external cache memory or level 2 (L2) caches. These external caches are located between the central processing unit (CPU) and the DRAM. Thus, the L2 cache is a separate chip residing externally with respect to the microprocessor. However, despite the apparent discontinuity in nomenclature, more and more microprocessors are incorporating larger caches into their architecture and referring to these internal caches as L2 caches. Regardless of the term used to describe the memory cache, the memory cache is simply an area of memory which is made of Static RAM to facilitate rapid access to frequently used information.

Because frequently accessed data may be stored in the cache memory area of main memory, the portion of the system which is accessing the main memory should be able to identify what area of main memory (cache or non-cache DRAM) it must access to retrieve the required information. A "tag RAM" is an area in the cache that identifies which data from the main memory is currently stored in each cache line. The actual data is stored in a different part of the cache, called the data store. The values stored in the tag RAM determine whether the actual data can be retrieved quickly from the cache or if the requesting device will have to access the slower DRAM portion of the main memory. The size of the data store determines how much data the cache can hold at any one time, and the size of the tag RAM determines what range of main memory can be cached. Many computer systems, for example, are configured with a 256 k cache and tag RAM that is 8 bits wide. This is sufficient for caching up to 64 MB of main memory.

In a multi-processor system, each processor may have access to the primary area of main memory, with each processor reserving a separate portion for its cache memory.

The process of managing the caches in a multi-processor system is complex. "Cache coherence" refers to a protocol for managing the caches of a multi-processor system so that no data is lost or over-written before the data is transferred from a cache to a requesting or target device. Each processor may have its own memory cache that is separate from a larger shared RAM that the individual processors will access. When these multi-processors with separate caches share a common memory, it is beneficial to keep the caches in a state of coherence by insuring that any shared operand that has changed in any cache is changed throughout the entire system.

Cache coherency is generally maintained through either a directory based or a snooping system. In a directory based system, the data being shared is placed in a common directory that maintains the coherence between the caches. The directory acts as a filter through which the processor must ask permission to load an entry from the primary memory into its cache. When an entry is changed, the directory either updates or invalidates the other caches with that entry. Disadvantageously, directory based coherency systems add to the cycle time (previously reduced by the implementation of cache memory) by requiring that each access to the cache memory go through the common directory. In typical snooping systems, all caches on a bus monitor (or snoop) the bus to determine if they have a copy of the block of data that is requested on the bus. Every cache has a copy of the sharing status of every block of physical memory it has.

Cache coherency is further exacerbated, however, when the computer system includes multiple processor buses. In a multi-bus shared memory system, a host controller maintains memory coherency throughout all of the processor caches. When a request is received by the host controller in a multi-bus architecture, the host controller snoops adjacent buses and performs associated coherency operations. Disadvantageously, these coherency operations often add cycle time to the processing of the requests to the memory. Any delays in processing the requests minimizes the effectiveness and is contrary to the purpose of incorporating cache memory into system RAMs which is to reduce the cycle time of the requests.

The present invention may be directed to one or more of the problems set forth above.

BRIEF DESCRIPTION OF THE DRAWINGS

The foregoing and other advantages of the invention will become apparent upon reading the following detailed description and upon reference to the drawings in which:

FIG. 3 is a flow chart illustrating the coherency control associated with a request in accordance with the present technique.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
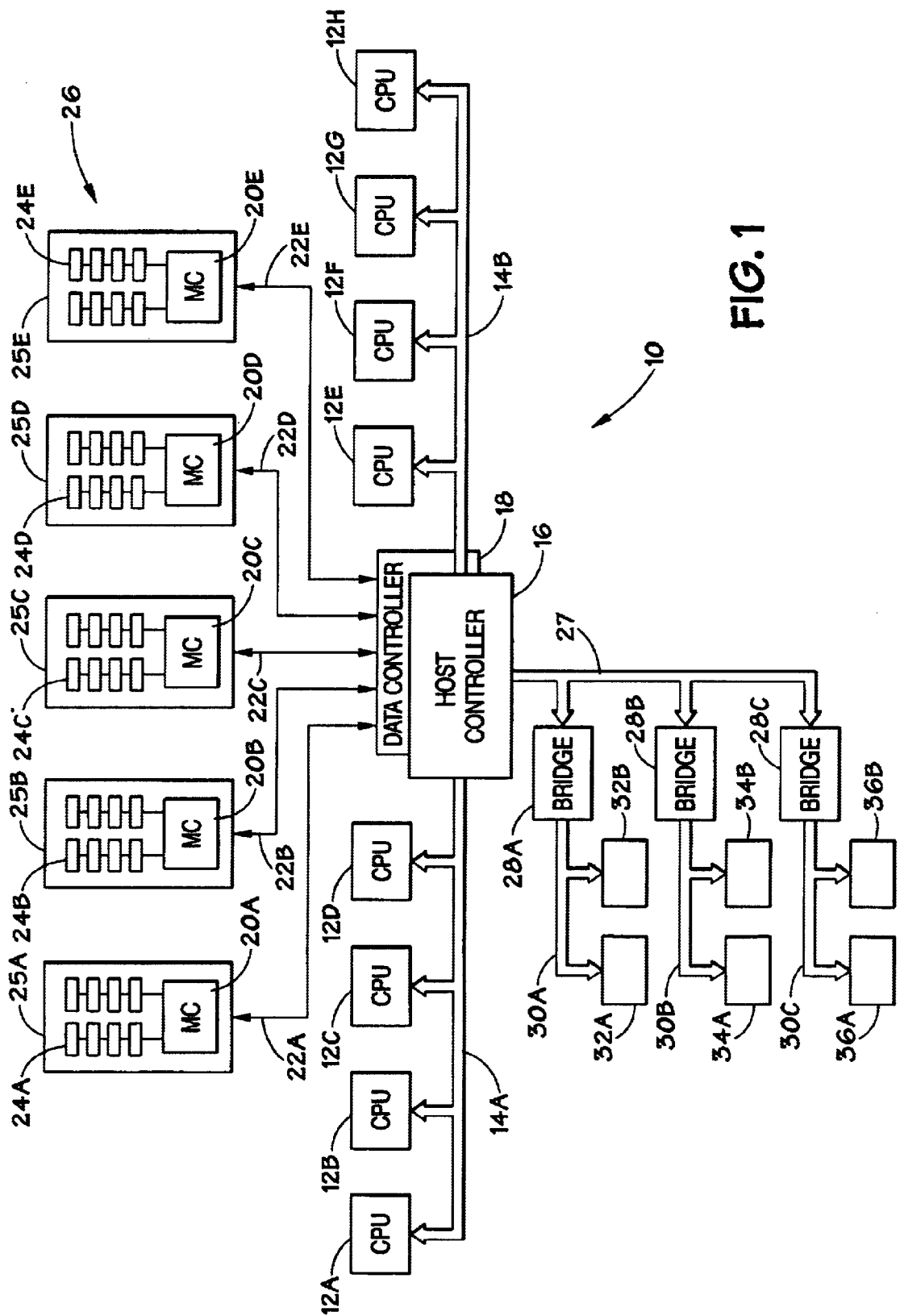
FIG. 1 is a block diagram illustrating an exemplary computer system having a multi-processor-bus architecture.

Turning now to the drawings and referring initially to FIG. 1, a block diagram of an exemplary multi-processor-bus computer system is illustrated and designated generally as reference numeral 10. The computer system 10 typically includes one or more processors or CPUs. In the exemplary embodiment, the system 10 utilizes eight CPUs 12A–12H. The system 10 utilizes a split bus configuration in which the CPUs 12A–12D are coupled to a first bus 14A, whereas the CPUs 12E–12H are coupled to a second bus 14B. It should be understood that the processor or CPUs 12A–12H may be of any suitable type, such as a microprocessor available from Intel, AMD, or Motorola, for example. Furthermore, any suitable bus arrangement may be coupled to the CPUs 12A–12H, such as a single bus, a split bus (as illustrated), or individual buses. By way of example, the exemplary system 10 may utilize Intel Pentium III processors and the buses 14A and 14B may operate at 100/133 MHz.

Each of the buses 14A and 14B is coupled to a chip set which includes a host controller 16 and a data controller 18. In this embodiment, the data controller 18 is effectively a data cross bar slave device controlled by the host controller 16. Therefore, these chips may be referred to together as the host/data controller 16,18. The host/data controller 16,18 is further coupled to main memory via one or more memory controllers. In this particular example, the host/data controller 16,18 is coupled to five memory controllers 20A–20E via five individual bus segments 22A–22E, respectively. Each of the memory controllers 20A–20E is further coupled to a segment of main memory designated as 24A–24E, respectively. As discussed in detail below, each of the memory segments or modules 24A–24E is typically comprised of dual inline memory modules (DIMMs). Further, each memory module 24A–24E and respective memory controller 20A–20E may comprise a single memory cartridge 25A–25E which may be removable. In the present configuration, data may be stored in a "4+1" parity striping pattern wherein one of the memory cartridges 25A–25E is used to provide redundancy for the collective memory system 26.

The host/data controller 16,18 is typically coupled to one or more bridges 28A–28C via an input/output (I/O) bus 27. The bridges 28A–28C may be any of a variety of suitable types, such as PCI, PCI-X, EISA, AGP, etc. The opposite side of each bridge 28A–28C is coupled to a respective bus 30A–30C. A plurality of peripheral devices 32A and 32B, 34A and 34B, and 36A and 36B may be coupled to the respective buses 30A, 30B, and 30C.

As previously discussed, each CPU 12A–12H may include a segment of cache memory for storing frequently accessed data and programs. Maintaining coherency among the plurality of caches in the CPUs 12A–12H is important to the efficient operation of the system 10. Maintaining coherency between the caches found in each CPU 12A–12H is further complicated by the split bus configuration since coherency should be maintained between the separate buses. Also, because requests may originate from or be directed to not only one of the CPUs 12A–12H but also from one of the peripheral devices 32A–32B, 34A–34B, or 36A–36B, cache coherency should be maintained along the I/O bus 27, as well. To maintain coherency, a mechanism is provided in the host controller 16 to facilitate efficient snooping of the buses in the present multi-processor-bus system 10, as discussed below.

Figure 2:
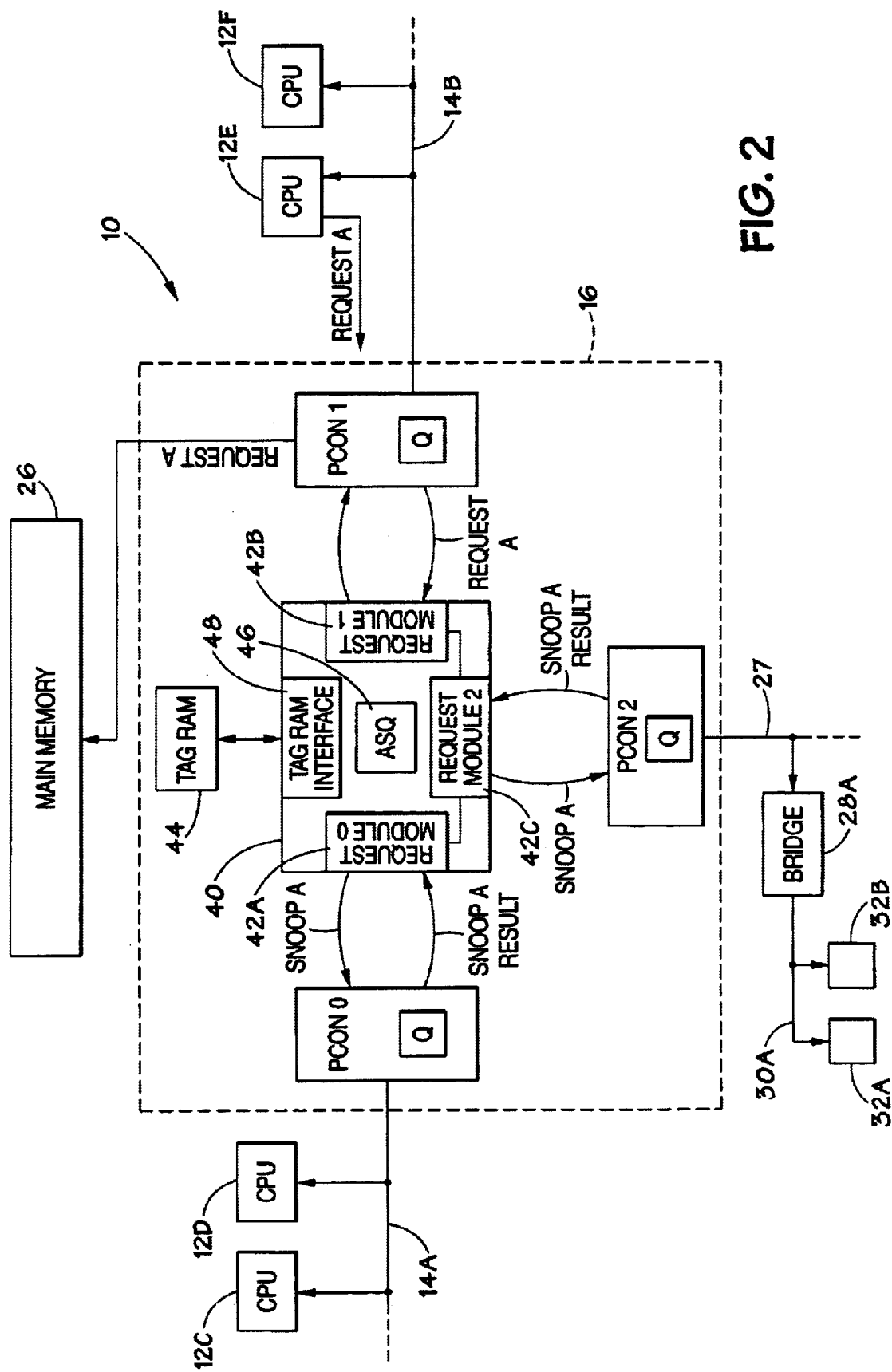
FIG. 2 is a block diagram illustrating a coherency control module for a computer system having a multi-processor-bus architecture.

The host controller 16 typically includes a processor controller (PCON) for each of the processor and I/O buses 14A, 14B, and 27, as illustrated in FIG. 2. For simplicity, the processor controller corresponding to the processor bus 14A is designated as "PCON0," the processor controller corresponding to the processor bus 14B is designated as "PCON1," and the processor controller corresponding to the I/O bus 27 is designated as "PCON2." Essentially, each processor controller PCON0–PCON2 serves the same function, which is to connect a respective bus that is external to the host controller 16 (i.e., processor bus 14A and 14B and I/O bus 27) to the internal blocks of the host controller 16. Thus, the processor controllers PCON0–PCON2 provide the interfaces between the buses 14A, 14B, and 27 and the host controller 16.

FIG. 2 illustrates a block diagram of a coherency control module (and associated system architecture) which may be used in accordance with the present techniques to efficiently manage the snooping process and maintain cache coherency. The coherency control module 40 functions as a snoop filter to minimize the number of snoop cycles required to obtain cache coherency. In the present embodiment, the coherency control module 40 resides within the host controller 16. Alternatively, the coherency control module 40 may reside within the data controller 18 or possibly in an external device which is coupled to each of the processor buses 14A and 14B and the I/O bus 27.

As previously discussed, each processor controller PCON0–PCON2 provides an interface between the coherency control module 40 and a respective bus. For each processor controller PCON0–PCON2, a corresponding request module 42A, 42B, and 42C is provided within the coherency control module 40. The request modules 42A–42C are responsible for interaction within a corresponding processor controller PCON0–PCON2. Further, arbitration elements, such as multiplexors (not shown) may be used to provide arbitration among the respective request modules 42A–42C. The arbitration elements are included in the generalized reference to the request module 42A–42C. Each request module 42A–42C accepts the cycle requests (READ or WRITE) from its respective processor controller PCON0, PCON1, and PCON2 and schedules the cycles to run through the tag RAM 44. The tag RAM 44 identifies which data from the main memory 26 is currently stored in the processor caches associated with each bus segment. The tag RAM 44 is described further below. Generally, each request module 42A–42C maintains proper request order, prioritizes the input, and establishes each of the request queues or list structures within the coherency control module 40. The request modules 42A–42C insure memory coherency through proper cycle order, arbitrate access to the memory among the processor and I/O buses 14A, 14B, and 27, and optimally utilize the tag look up bandwidth.

Each request module 42A–42C includes a plurality of READ and WRITE request buffers (not shown). A separate READ and a separate WRITE buffer may be provided for each bus 14A, 14B, and 27 in the system, for instance. Each processor controller PCON0–PCON2 monitors a corresponding bus and filters the cycle requests to the coherency control module 40. The requests from the processor controllers PCON0–PCON2 are stored in the READ and WRITE buffers until the requests can be processed. Each request module 42A–42C also includes a plurality of list structures or request queues (not shown) corresponding to the various READ and WRITE buffers. The list structures maintain the proper ordering of requests through the buffers in the coherency control module 40. Prioritization among the various requests may be arbitrated through any number of schemes based on user requirements. The particular arbitration scheme selected and the mechanism for implementing that scheme are inconsequential to the present invention. The technique described herein can be incorporated in any multi-processor-bus architecture which implements a bus monitoring or snooping system to maintain cache coherency.

The coherency control module 40 also includes an active snoop queue (ASQ) 46 which may include one or more buffers (not shown) which contain the indices of all requests that are currently active in the coherency control module 40. The indices are used to prevent multiple accesses to the same index simultaneously. In general, the ASQ 46 includes buffers to maintain a list of current cycles that are being processed through the tag RAM interface module 48. The tag RAM interface module 48 provides the interface between the tag RAM 44 and the coherency control module 40 as will be described further below. The ASQ 46 only permits one access per cache line index at a time to maintain proper cycle order and cache state information. In the present embodiment, there is one ASQ 46 for each tag RAM interface module 48. A single ASQ 46 and tag RAM interface module 48 are illustrated in FIG. 2. However, it may be advantageous to incorporate more than one ASQ 46 and tag RAM module 48 to provide for even and odd addressing, for instance. In the present embodiment, each ASQ 46 permits sixteen cycles to be active at a time, with each of these cycles being processed independently. Because the ASQ 46 buffers include a fixed number of locations, the number of tag lines that are currently active is limited by the size of the buffers in the ASQ 46.

The tag RAM interface module 48 provides the interface with the tag RAM 44. As previously stated, the tag RAM 44 tracks cachelines stored on each bus segment. In other words, the tag RAM 48 provides a look-up table for data stored in cache memory. The tag RAM interface module 48 may be configured to optimize SRAM access efficiency by implementing a variety of techniques to minimize the number of clock cycles used to switch between READ and WRITE requests, for instance. The tag RAM interface module 46 may also be configured to reduce the number of READ requests to the SRAM whenever possible by interpreting the cache data based on the cycle characteristics. This may occur if a cycle has a non-cacheable attribute or if the cycle is an explicit writeback. When one of these cycles occur, the tag RAM interface module 48 may switch from a READ mode to a WRITE mode. The tag RAM interface module 48 may also minimize the amount of WRITEs to the SRAM whenever the processor performs a WRITE to an unallocated address. This preserves the address that was allocated prior to the WRITE and alleviates the need to perform an unnecessary cast out of data.

When a request (READ) is received by the host controller 16 in a multi bus segment architecture, such as in the computer system 10, the host controller 16 typically snoops adjacent buses (i.e. the remaining system buses from which the present request did not originate) as required and then searches a posting queue for posted writebacks to the same address. If a posted writeback is detected, it is reordered and expedited to memory and followed by a reread. By forcing the writeback before the READ request is processed, the READ request is assured of returning the most current data. After these operations are complete, the host controller 16 can retire the original request. The challenge is to minimize the time required to perform these coherency operations to minimize the time required to process the request.

The typical method of resolving coherency is to serialize the snoop, writeback search and reread operations, as described above. First the snoop is issued to the bus segment having the address cached. When the snoop results are returned to the host controller 16, the coherency control module searches for posted writebacks with the same address. If a writeback is detected, it is reordered to memory and either snarfed or reread. "Snarfing" generally refers to grabbing a copy of the writeback data from the bus while it is being sent back to memory. A memory "reread," on the other hand, refers to completing the execution of the writeback to memory and issuing a second read or reread to that address. Snarfing may be more efficient since it does not require an additional step to reread the address. However, snarfing may be disadvantageously more complex to implement than a simple reread. When these operations are complete, the original request is retired. When the coherency operations are serialized in this manner, the cycle execution is delayed and overall system performance is impacted.

The present technique performs the snooping operation in parallel with the posting queue search, the reordering of writeback data to memory and the subsequent reread. This reduces the time to complete the coherency analysis and thereby reduces the cycle time for completing the request. FIG. 3 is a flow chart illustrating the procedure for processing a request through the multi-processor-bus computer system 10 illustrated in FIGS. 1 and 2. FIG. 3 should be viewed in conjunction with the continued discussion of FIG. 2 and in conjunction with the following description of the request process.

Initially, a request (READ) is initiated by a CPU 12A–12H, or some I/O device 32A–32B, 34A–34B, or 36A–36B. By way of example, a READ request to address A ("Request A") is initiated by the CPU 12E, as illustrated in FIG. 2 and as indicated by block 70 of FIG. 3. Request A is received by the host controller 16 via the processor bus 14B. The processor controller PCON1 initiates Request A to both the coherency control module 40 and to the main memory 26, as indicated by blocks 72 and 74 of FIG. 3. Advantageously, by initiating the request to the slower access main memory 26 before analyzing the cached status of the requested data (i.e. checking the cache memory to determine whether the requested data is also stored in the more easily accessible cache memory), the cycle time for processing the request is minimized even if the data is not stored in cache memory since the request is immediately initiated to the main memory 26. If the data corresponding to Request A is found in the cache memory, the request to the main memory 26 will be cancelled, as explained further below.

After the processor controller PCON1 initiates Request A, the host controller 16 analyzes the cached status of the requested data by issuing snoops to the adjacent buses, here the processor bus 14A and the I/O bus 27, to check if one of the buses 14A or 27 currently has the requested address (A) cached, as indicated by block 76 of FIG. 3. Each snoop request to address A ("SNOOP A") is delivered from the request module 42A and 42B to a corresponding processor controller, PCON0 and PCON2, as illustrated in FIG. 2. The snoop request SNOOP A is stored in an outbound snoop queue ("Q") to await its turn gaining access to the processor bus. The snoop queue Q is preferably a first in first out (FIFO) queue in which snoop requests, such as SNOOP A, are processed in the order in which they are received.

As previously indicated, in typical systems, the coherency module 40 within the host controller 16 waits until receiving the results of the snoop ("SNOOP A RESULT") before the original READ request (REQUEST A) can be processed. If the SNOOP A RESULT is clean, (i.e. the adjacent bus does not have the requested data cached), the host controller 16 searches its posting queues (not shown) for posted writebacks, and only then can the original request be retired. To expedite this process, a prediction technique is implemented in the present embodiment. The prediction technique is used to identify the next snoop transaction to be processed by the request module 42. Because the outbound snoop queues Q are FIFOs, the snoop requests are processed in a predictable order. Thus, a future snoop transaction can be predicted. Once the future snoop transaction is identified, the coherency control module 40 will search the posting queues in the host controller 16 for writebacks to coherently process the original request, as indicated by block 78 of FIG. 3. If a posted writeback is detected, the posted writeback is reordered and written to the main memory 26 followed by a snarf of writeback data or a second READ (or reread) of the main memory 26, as indicated by block 80. This insures that the latest data is returned to the requestor when completing the original READ request. Using this technique, the snooping request SNOOP A (block 76) is performed in parallel with the posting queue search (block 78), the reordering of writeback data to the main memory 26 and the subsequent reread (block 80). By placing these operations in parallel, the overall time to process the original request is reduced.

If the SNOOP A RESULT finds the address A, the data is taken from the cache memory and the request sent directly to the main memory 26 by PCON1 (block 74) is cancelled. If the SNOOP A RESULT does not find the address A, the posting queue process described above is implemented. Thus, a snoop request, such as SNOOP A is delivered to the processor controller PCON0/PCON2 and placed in the outbound snoop queue Q. The processor controller PCON0/PCON2 runs the snoop requests on its corresponding bus 14A/27 based on the order of the snoop queue Q. In accordance with the present technique, the processor controller will return both the immediate snoop request results and the address of the next snoop request that will run. For example, the outbound snoop queue Q of PCON0 may have two snoop requests (SNOOP C and SNOOP B) waiting to be run on the processor bus 14A. When SNOOP A is received by the processor controller PCON0, it is injected into the Q and will be run third, after SNOOP C and SNOOP B. Once SNOOP C is run on the processor bus 14A, the processor controller PCON0 will return not only the result of the SNOOP C transaction, but will also return the address corresponding to the SNOOP B request. By returning the next address that will be snooped, the coherency control module 40 is able to begin checking the request posting queues in the host controller 16 before the bus is snooped for the corresponding address. This technique for predicting the next address to be snooped based on the outbound snoop queue Q allows for early searching of the posting queues and thereby minimizes the overall request processing time.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of maintaining coherency in a multi-processor-bus computer system comprising the acts of:
   (a) receiving a request at a host controller from a first bus, the request having a corresponding first address;
   (b) initiating a first read to a first portion of memory corresponding to the first address;
   (c) snooping a second bus for the first address;
   (d) determining the next snoop transaction to be processed, the next snoop transaction having a corresponding second address; and
   (e) searching a posting queue for a posted writeback, the posted writeback having the corresponding second address, wherein the act of searching occurs simultaneously with respect to the act of snooping.

2. The method of maintaining coherency, as set forth in claim 1, further comprising the acts of:
   (a) detecting a posted writeback having the corresponding second address in the posting queue;
   (b) re-ordering the posting queue such that the posted writeback to the second address is moved up in the posting queue; and
   (c) initiating a second read to a second portion of memory corresponding to the second address.

3. The method of maintaining coherency, as set forth in claim 2, wherein the acts of detecting, re-ordering and initiating a second read occur simultaneously with respect to the act of snooping.

4. The method of maintaining coherency, as set forth in claim 1, wherein act (a) comprises the act of receiving a request at a host controller from a processor bus.

5. The method of maintaining coherency, as set forth in claim 1, wherein act (a) comprises the act of receiving a request at a host controller from an input/output (I/O) bus.

6. The method of maintaining coherency, as set forth in claim 1, wherein the act of snooping is performed by a coherency control module.

7. The method of maintaining coherency, as set forth in claim 1, wherein act (d) comprises the acts of:
   (a) searching a snoop queue in a processor controller corresponding to the second bus; and
   (b) returning a next snoop forecast signal from the processor controller to the coherency control module, the next snoop forecast signal comprising the corresponding second address.

8. A method of predicting a future snoop transaction comprising the acts of:
   (a) initiating a snoop request having a corresponding first address from a coherency control module to a processor controller;
   (b) returning a snoop result corresponding to the first address from the processor controller to the coherency control module;
   (c) returning a next snoop forecast signal having a second address and corresponding to the next snoop request to processed from the processor controller to the coherency control module; and
   (d) searching a posting queue for a posted writeback, the posted writeback having the second address, wherein the act of searching occurs simultaneously with the act of initiating.

9. The method of predicting a future snoop transaction, as set forth in claim 8, further comprising the acts of:
   (a) detecting the posted writeback having the corresponding second address in the posting queue;
   (b) re-ordering the posting queue such that the posted writeback to the second address is moved up in the posting queue; and
   (c) initiating a second read to a second portion of memory corresponding to the second address.

10. The method of predicting a future snoop transaction, as set forth in claim 9, wherein the acts of detecting, re-ordering and initiating a second read occur simultaneously with respect to the act of snooping.

11. The method of predicting a future snoop transaction, as set forth in claim 8, wherein acts (b) and (c) occur simultaneously.

12. A method of maintaining cache coherency in a multi-processor-bus computer system comprising the acts of:
   (a) reading a snoop transaction queue comprising at least a first snoop request having a first address and a second snoop request having a second address, the second snoop request being prioritized subsequent to the first snoop request in the snoop transaction queue; and
   (b) processing the first snoop request while simultaneously searching a posting queue for a posted writeback having the second address corresponding to the second snoop request.

13. The method of maintaining a cache coherency in a multi-processor-bus computer system, as set forth in claim 12, further comprising the acts of:
   (a) detecting the posted writeback having the corresponding second address in the posting queue;
   (b) re-ordering the posting queue such that the posted writeback to the second address is moved up in the posting queue; and
   (c) initiating a second read to a second portion of memory corresponding to the second address.

14. The method of maintaining cache coherency in a multi-processor-bus computer system, as set forth in claim 13, wherein the acts of detecting, re-ordering and initiating a second read occur simultaneously with respect to the act of snooping.

15. The method of maintaining cache coherency in a multi-processor-bus computer system, as set forth in claim 12, wherein act (a) comprises the acts of:
   (a) searching the snoop queue in a processor controller; and
   (b) returning a next snoop forecast signal from the processor controller to a coherency control module, the next snoop forecast signal having a second address and corresponding to the second snoop request.

16. A coherency control module configured to snoop a bus for a first address while simultaneously searching a posting queue for a second address corresponding to a posted writeback.

17. The coherency control module, as set forth in claim 16, comprising a first request module configured to receive requests from a first processor controller.

18. The coherency control module, as set forth in claim 17, comprising a second request module configured to issue snoops to a second processor controller.

19. The coherency control module, as set forth in claim 18, wherein the posting queue resides in the second processor controller.

20. The coherency control module, as set forth in claim 16, wherein the coherency control module is configured to snoop a processor bus for the first address.

21. The coherency control module, as set forth in claim 16, wherein the coherency control module is configured to snoop an input/output (I/O) bus for the first address.

* * * * *